March 24, 1970 P. E. MYERS Re. 26,836

ELECTRIC SPEED CONTROL FOR SEWING MACHINE

Original Filed Feb. 21, 1964 5 Sheets-Sheet 1

INVENTOR.
PHILIP E. MYERS,
BY
Wolfe, Hubbard, Voit & Osann
ATTORNEYS.

ELECTRIC SPEED CONTROL FOR SEWING MACHINE

Original Filed Feb. 21, 1964 5 Sheets-Sheet 2

INVENTOR.
PHILIP E. MYERS,
BY
Wolfe, Hubbard, Voit & Osann
ATTORNEYS.

ELECTRIC SPEED CONTROL FOR SEWING MACHINE

Original Filed Feb. 21, 1964 5 Sheets-Sheet 3

INVENTOR.
PHILIP E. MYERS,
BY
Wolfe, Hubbard, Voit & Osann
ATTORNEYS.

ELECTRIC SPEED CONTROL FOR SEWING MACHINE

Original Filed Feb. 21, 1964 5 Sheets-Sheet 4

INVENTOR.
PHILIP E. MYERS,
BY Wolfe, Hubbard, Voit & Osann
ATTORNEYS.

ELECTRIC SPEED CONTROL FOR SEWING MACHINE

Original Filed Feb. 21, 1964 5 Sheets-Sheet 5

INVENTOR.
PHILIP E. MYERS,
BY
Wolfe, Hubbard, Voit & Osann
ATTORNEYS.

United States Patent Office

Re. 26,836
Reissued Mar. 24, 1970

26,836
ELECTRIC SPEED CONTROL FOR SEWING MACHINE

Philip E. Myers, Beloit, Wis., assignor to Warner Electric Brake & Clutch Company, South Beloit, Ill., a corporation of Delaware Original No. 3,253,563, dated May 31, 1966, Ser. No. 346,510, Feb. 21, 1964. Application for reissue Dec. 15, 1967, Ser. No. 694,774
Int. Cl. D05b *69/00;* F16d *11/06, 23/10*
U.S. Cl. 112—220 22 Claims

Matter enclosed in heavy brackets [ ] appears in the original patent but forms no part of this reissue specification; matter printed in italics indicates the additions made by reissue.

*ABSTRACT OF THE DISCLOSURE*

*In the drive of a device at selectable and different ones of a plurality of speeds from a rotating power source, and with each speed controlled to have the desired value, there is disclosed a constant speed electric motor supplying input motive power to a transmission coupled at its output to a sewing machine. The transmission includes an electromagnetic clutch 38 having an input member 54 driven from the motor 35 and an output member 49 coupled to the machine, together wtih an actuating coil 62 which upon electrical energization or deenergization actuates or deactuates the clutch to effect driving engagement or disengagement between the input and output members, and thus between the motor and the machine. A speed controller 76 drivingly coupled to the output member 49 includes normally closed, centrifugally actuated switch contacts 88, 90 which are so arranged to open when the output member's speed exceeds a predetermined value $W_1$ (which may, incidentally, be adjustable). Circui connections (FIG. 7) provide an operator with the options of (a) connecting the coil 62 in series with a voltage source through the contacts 88, 90 (b) connecting the coil in series with the voltage source independently of the contacts, or (c) isolating the coil from the voltage source. Under condition (b) the clutch members are steadily engaged, and the machine is driven directly and at a high speed $W_2$. Under condition (c), the clutch members are steadily disengaged, and the machine is at rest. Under condition (a), however, the clutch coil is deenergized or energized as the speed of the output member rises above and falls below the value $W_2$, so that by automatic intermittent engagement and slippage, the clutch drives the machine at a speed which is substantially constant but has the predetermined average value $W_1$, which is lower than the value $W_2$. A plurality of centrifugal switches connected to provide a greater selection of controlled speeds are also shown (FIG. 9). An electric brake is disclosed as being actuatable under condition (c), to brake the driven machine to a stop.*

The present invention relates in general to a power transmission system for sewing machines and, more particularly, to an improved drive arrangement for sewing machines of the type employing electromagnetic power transmitters. In its principal aspects, the invention is concerned with an improved sewing machine power transmission system which permits of automatic operation at relatively constant selectable speeds and, more specifically, at a selectable one of two or more substantially constant speeds or, alternatively, at a selectable one of an infinitely variable speed and two or more substantially constant speeds, yet wherein there is no requirement for auxiliary power take-offs or auxiliary constant speed drive motors.

Consistent with recent technological advances in the field of automation, there has been an ever increasing demand for power machines of the industrial type which are substantially automatic in operation and wherein machine output can be correlated primarily with the speed or capacity of the particular machine rather than primarily with the speed or proficiency of the operator. In the garment or textile industry, this problem has manifested itself in providing industrial-type sewing machines capable of operating at, or approximately at, known constant speeds, thus insuring that maximum productivity is achieved commensurate with the particular pattern of the article being sewn, the particular characteristics of the material being worked upon, and the varying proficiencies of the different machine operators.

One facet of the problem heretofore presented to the manufacturers and users of high-speed, industrial-type sewing machines has been that of providing a sewing machine power transmission which can be quickly and accurately stopped by the operator with the needle either penetrating the work (i.e., the "needle down" position) or with the needle withdrawn from the work (i.e., the "needle up" position). The former, or "needle down" position, is required when the operator wishes to turn or pivot the work about the engaged needle so as to permit continued sewing in a different direction. The latter, or "needle up" position, is required when the operator wishes to remove the work or to make necessary thread adjustments or the like. However, because of the relatively high rates of speed involved with industrial-type sewing machines (e.g., speeds on the order of up to or in excess of 8,000 r.p.m.), it is difficult—indeed, virtually impossible—to apply the brake at that particular instant which will insure that the machine stops in the desired position. To resolve this difficulty, numerous attempts have been made to devise a satisfactory position controlling system which insures that the needle will come to rest in a desired position, e.g., the "needle down" position. Included among these attempts have been various proposals for initially dropping the speed of the sewing machine to a relatively slow, generally constant, known speed which permits application of braking power to the driven system components at, or approximately at, the same phase conditions every time that the machine is stopped. Such proposals have typically involved the use of relatively expensive auxiliary positioning motors, auxiliary power take-offs, or multiple clutching arrangements and the like—all systems which generally require gear trains or similar speed reducing units which are noisy, require considerable lubrication, are relatively large and space consuming, and which are difficult to adjust for different specific applications. As a consequence, these machines are generally custom built by the manufacturer to suit a particular need of the user and they are not generally suitable for use in other applications which require different operating speeds.

Another facet of this problem has been the demand in the textile industry for sewing machines which can be used in training unskilled personnel or which can be used in training skilled personnel in the performance of some new and intricate operation. In either case, it is desirable that the training operation be initiated at a relatively slow, preferably constant, speed and, as the operator's proficiency increases, the speed of the machine is also increased. To accomplish this, it has heretofore been the general practice to provide a special training machine having a multi-speed drive, which permits initial training of the operator under close supervision at a relatively low machine speed. As in the case of the typical needle positioning systems mentioned above, sewing machine power transmission systems capable of operating at such a relatively low speed have heretofore generally required either a separate slow speed power source or some type of auxiliary drive connection employing a speed reducing gear train or the like. As an alternative to these approaches, it has been necessary to provide some means for varying the input-output speed ratio of the belted driving connection as, for example, by stopping the machine and actually shifting the drive belt from one pulley to another, or by changing the drive pulley, or by varying the diameter of the pulley.

However, the former systems—that is, those requiring special slow speed motors, auxiliary power take-offs, or the like—have simply not provided a satisfactory solution to the problem. Primary disadvantages of conventional sewing machines have been their initial high cost, the cost of maintenance thereof, and excessive noise and weight, as well as excessive space required to house the auxiliary slow speed transmission components. Moreover, such transmissions are generally not adjustable without making substantial structural revision. And, of course, where such systems are employed in conjunction wtih a sewing machine of the type employing an electromagnetic clutch and an electromagnetic brake, provision must be made for isolating those components of the system requiring lubrication from the electromagnetic clutch and brake.

The latter types of systems—i.e., those requiring variation in the belted drive connection—have also failed to provide a satisfactory solution to the problem. That is, while these types of systems are adjustable, they either fail to provide the necessary degree of control over the operating speed of the machine (e.g., no provision is made for insuring that the machine can be operated at a relatively low constant speed) or they require a considerable amount of lost or dead time in order to vary or adjust the machine's operating speed.

Accordingly, it is a general object of the invention to provide an improved sewing machine power transmission system which overcomes all of the foregoing disadvantages and which is characterized by its simplicity and reliability in operation. More specifically, is is an object of the invention to provide an improved multiple speed sewing machine drive arrangement characterized by its versatility and wherein a single machine may be readily used for either production operations or for training both inexperienced and experienced personnel.

In one of its important aspects, it is an object of the invention to provide an improved method and apparatus for driving sewing machines of the type employing an electromagnetic power transmitter at a relatively constant speed, or at a selectable one of n different constant speeds, irrespective of fluctations in load or line voltage. While not so limited in its application, the invention will find especially advantageous use in conjunction with sewing machines of the type employing needle positioning control systems wherein it is essential that the machine be operating at a known speed at the time that the brake is applied.

A further object of the invention is the provision of a novel multiple speed drive arrangement for sewing machines which permits of selective operation of the machine at one of two or more constant speeds, or alternatively, at one of an infinitely variable speed and two or more constant speeds. It is a related object of the invention to provide a multiple-speed sewing machine drive arrangement of the foregoing character wherein the different constant speed settings are independently adjustable, thus further increasing the versatility of the sewing machine and permitting adjustment of the machine speed during training operations as the proficiency of the trainee increases. As a consequence of attaining these objectives, it is possible to preset each sewing machine to run at that speed which insures optimum production commensurate with the particular pattern being utilized and material being sewn—that is, the sewing machine can be set to operate only at the speed or speeds set by management and hence the operation is controlled by the speed of the machine rather than by the speed of the operator.

In accordance with another of the important aspects of the invention, it is an object to provide an improved sewing machine drive arrangement which does not require any auxiliary power source or any auxiliary speed reducing gear trains or the like and, which is, therefore, inexpensive, compact, light in weight, quiet, and substantially maintenance-free. An ancillary object of the invention is the provision of a gearless multi-speed drive arrangement which does not require lubricant and is, therefore, particularly suitable for use with sewing machines of the type employing an electromagnetic clutch and brake.

Yet another object of the invention is the provision of a sewing machine drive arrangement which permits of operation over a wide range of accurately controlled fixed speeds, and wherein each operating speed selected remains substantially constant irrespective of minor fluctuations or variations in the position of the operator actuated speed selector.

Other objects and advantages of the invention will become apparent as the following description proceeds taken in conjunction with the accompanying drawings, in which.

Figure 1:
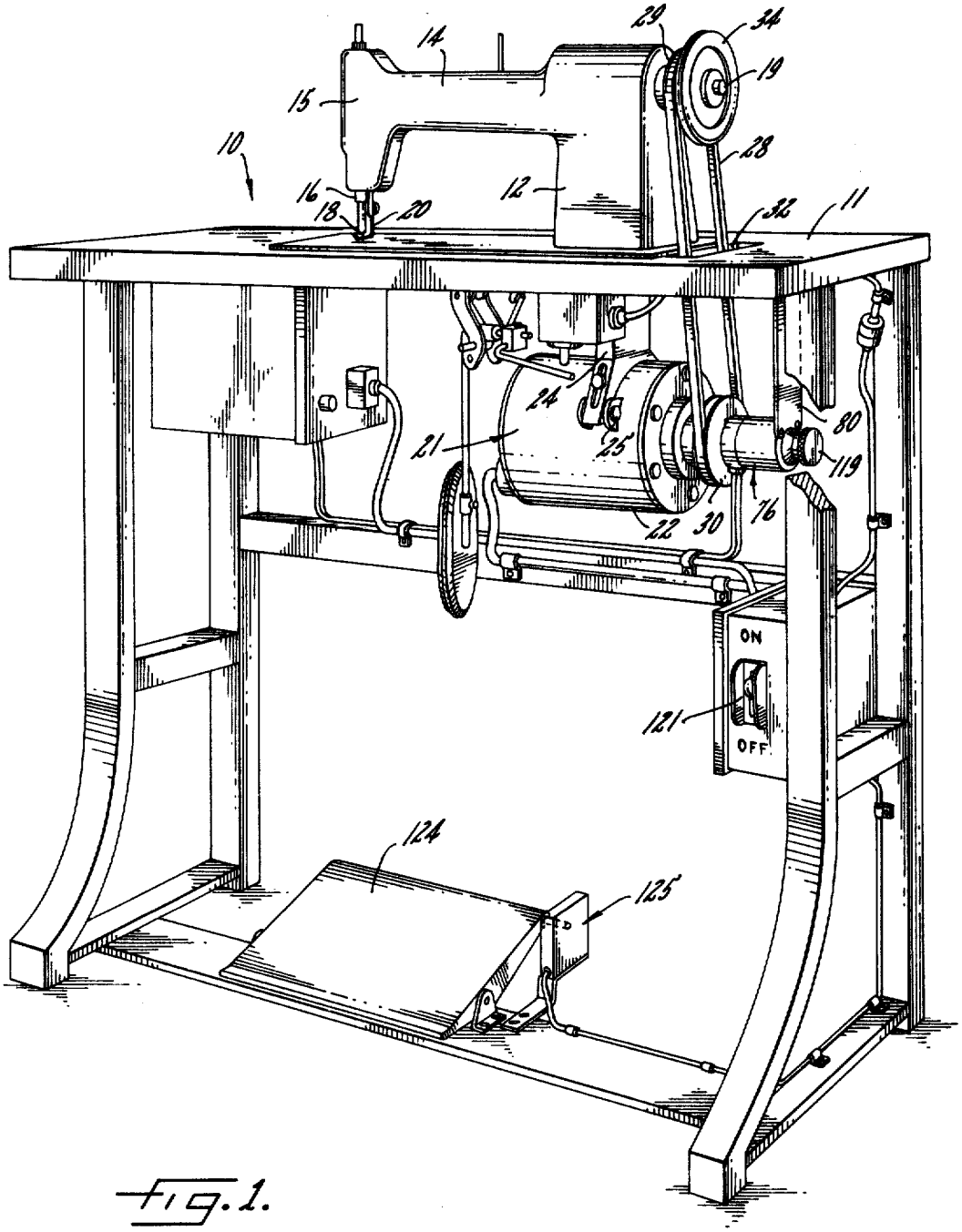
FIGURE 1 is a perspective view of an industrial-type sewing machine embodying the features of the present invention.
Figure 6:
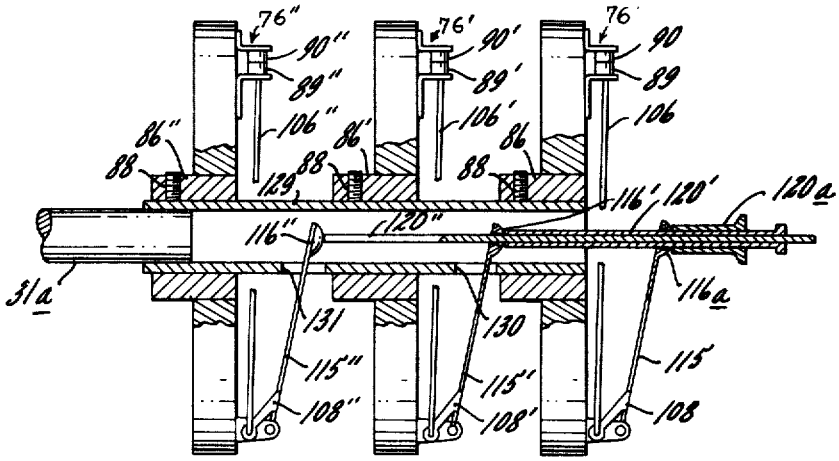
FIG. 6 is a fragmentary vertical sectional view similar to FIG. 3 but here depicting an arrangement of three centrifugal type speed controllers, each similar to the speed controller shown in FIGS. 3 and 4 but here illustrated with the cover and wiper assemblies removed.
Figure 7:
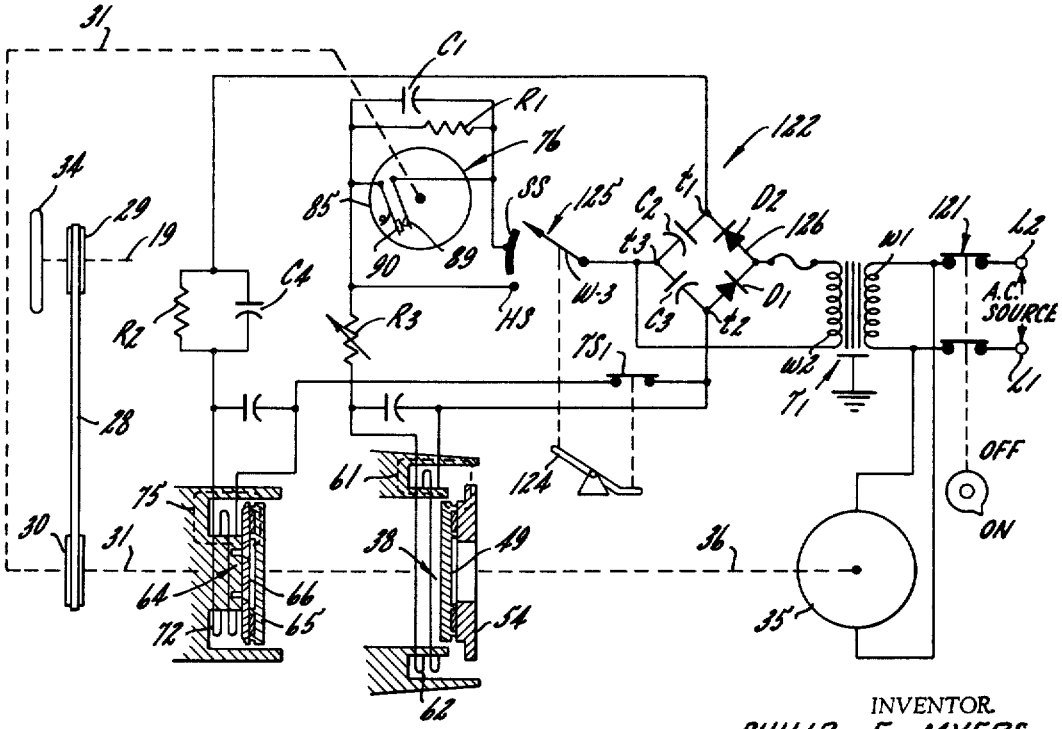
FIG. 7 is a schematic wiring diagram illustrating the electrical components used in an exemplary control circuit for the embodiment of the invention shown in FIGS. 1 through 4.
Figure 8:
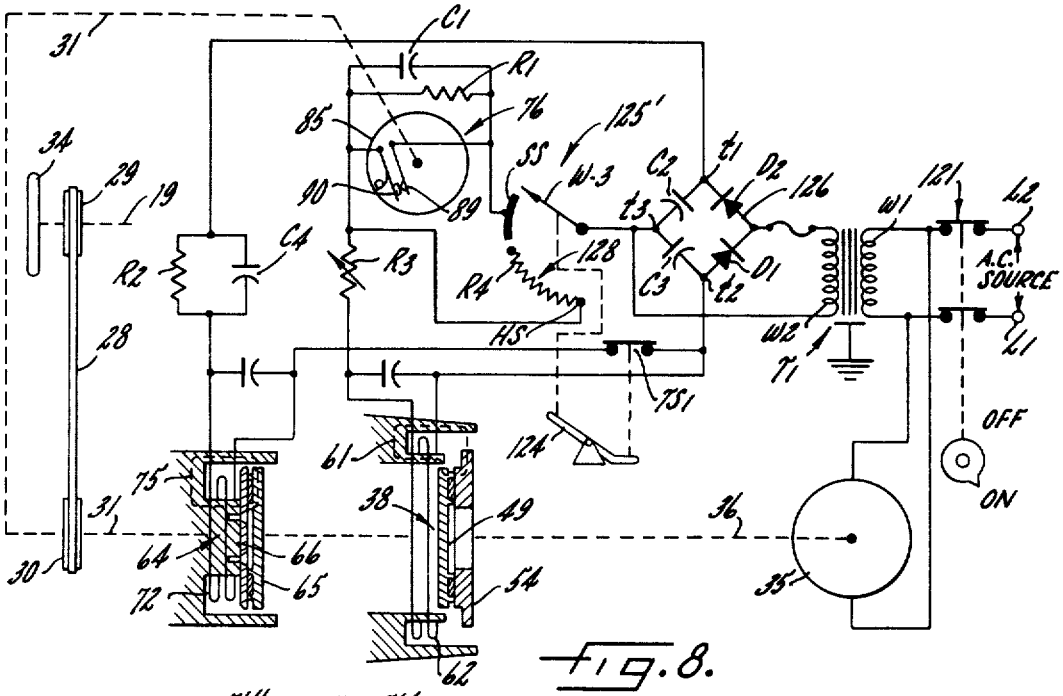
Figure 9:
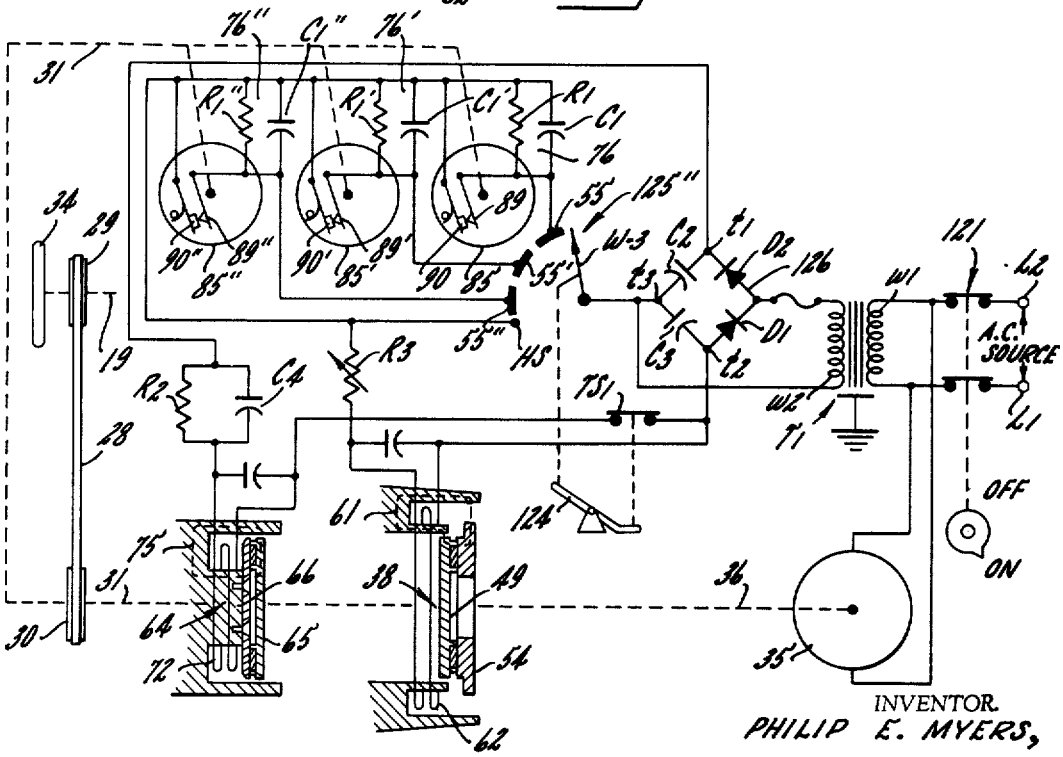

FIG. 8 is a schematic wiring diagram similar to FIG. 7 and here depicting the electrical components used in an exemplary control circuit for permitting operation of the sewing machine shown in FIG. 1 at a selectable one of an infinitely variable speed and two constant speeds; and, FIG. 9 is a schematic wiring diagram similar to FIG. 8 and here depicting the electrical components used in an exemplary control circuit embodying the modified speed controller arrangement shown in FIG. 6.

While the present invention is susceptible of various modifications and alternative forms, specific embodiments thereof have been shown by way of example in the drawings and will herein be described in detail. It should be understood, however, that it is not intended to limit the invention to the particular forms disclosed herein, but, on the contrary, the intention is to cover all modifications, equivalents and alternatives falling within the spirit and scope of the invention as expressed in the appended claims.

Referring now to the drawings, there is illustrated in FIG. 1 an exemplary power driven sewing machine, generally indicated at 10, embodying the features of the present invention. In the illustrative form of the invention, the sewing machine 10 is mounted on a table 11 and includes an upright pedestal 12 rigidly secured to the table top. Projecting laterally from, and integral with, the upper end of the pedestal 12 is a horizontal arm 14, the latter being substantially parallel with and spaced above the top of the table so as to overlie the material being sewn. The free end of the arm 14 terminates in a hollow head 15 which houses and supports the upper end of a reciprocatory needle bar 16, the latter carrying a vertically disposed sewing machine needle 18 adapted to be driven into and out of material supported on the table top to effect stitching thereof. In the exemplary device, the needle bar 16 is coupled in a conventional manner (not shown) to one end of a horizontally disposed shaft 19 supported and journalled for rotation in the arm 14 and the upper end of the pedestal 12, the other end of the shaft projecting laterally of the pedestal (i.e., to the right as viewed in FIGS. 1 and 2). As is conventional in sewing machines of the type illustrated, a bifurcated presser foot 20 is supported in the head 15 for endwise movement therein, the presser foot being normally biased into a position wherein the material being stitched is held flat and in snug conformity to the table top.

Figure 2:
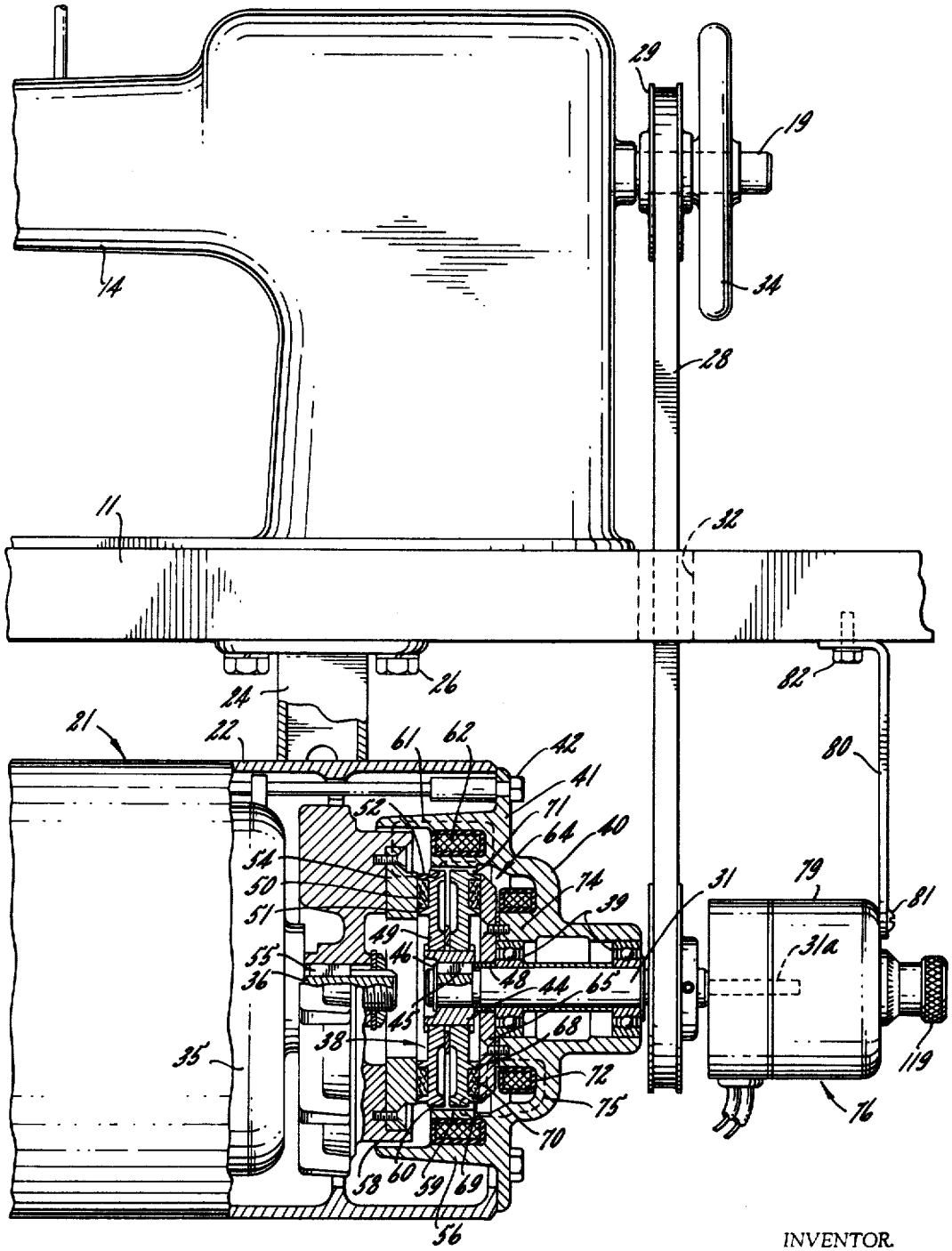
FIG. 2 is an enlarged fragmentary front elevation, in partial section, of the machine shown in FIG. 1, here illustrating details of the electromagnetic clutch and brake assemblies used in conjunction with the present invention.

For the purpose of driving the needle bar 16 and shaft 19 during an operating cycle of the sewing machine 10, a power transmitter, generally indicated at 21, is rigidly secured to the lower surface of the table 11. In the illustrative device, this is accomplished by securing the housing 22 of the power transmitter to the free extremities of a yoke-like bracket 24 by means of bolts 15 or other suitable fasteners. The bracket 14 is in turn secured directly to the bottom of the table 11, for example, by bolts 26 or the like, as best shown in FIG. 2. In order to permit transmission of power from the transmitter 21 to the shaft 19 of the sewing machine 10, a drive belt 28 is trained about drive pulleys 29, 30 which are keyed or otherwise non-rotatably secured to respective different ones of the laterally projecting extremities of the shaft 19 and the output shaft 31 of the transmitter 21. As here shown, the drive belt 28 passes through an opening 32 formed in the table 11. A handwheel or flywheel 34 is secured to the outboard end of the shaft 19 adjacent to the pulley 29 in a manner commonly employed with sewing machines of the type illustrated.

To facilitate an understanding of the present invention, the general organization and operation of the power transmitter 21 will be briefly described hereinbelow. Those interested in a more complete operational and structural description of the transmitter 21 are referred to the copending application of Philip E. Myers, Serial No. 239,613, filed November 23, 1962, and assigned to the assignee of the present invention.

Referring to FIG. 2, it will be noted that the power transmitter 21 includes an electric motor 35 which is mounted within the tubular housing 22 and which is coupled to any suitable current source (not shown) for effecting energization thereof. As here shown, the motor shaft 36 is adapted to be selectively and disengageably connected to the output shaft 31 of the transmitter 21 by means of an electromagnetic friction clutch, generally indicated at 38. To this end, the shaft 31 is maintained in axially spaced, coaxial relation with respect to the motor shaft 36, as for example, by journalling the shaft 31 in spaced antifriction bearings 39 carried by the hub 40 of an end cap 41—the latter being rigidly secured to the housing 22 by means of suitable fasteners 42. The inner end of the shaft 31 (i.e., the left end, or the end adjacent the motor shaft 36 as viewed in FIG. 2) has mounted thereon an externally splined annular ring 44 which is keyed to the shaft 31 for simultaneous rotation therewith by means of a suitable key 45. An snap ring 46 and annular spacer 48, the latter being disposed between the ring 44 and the innermost bearing 39, are utilized to hold the ring 44 in a fixed axial position relative to the shaft 31.

For the purpose of completing a disengageable driving connection, the electromagnetic friction clutch 38 includes an internally splined disk 49 of magnetic material which is loosely fitted on the externally splined ring 44, the mating splined arrangement permitting freedom of limited axial movement between the disk 49 and the ring 44 while providing a rotatable drive connection therebetween. A ring of friction material 50 is secured to the inner face of the disk 49, the friction material being confined within the radially spaced annular flanges 51, 52 integral with the disk. The inner radial surfaces or pole faces of the flanges 51, 52 are flush with the inner radial surface of the friction material 50. The arrangement is such that the inner radial faces of the friction material 50 and the flanges 51, 52 are juxtaposed to the outer radial face of a flywheel 54, the latter being non-rotatably secured, as by a key 55, to the motor shaft 36.

In the exemplary construction, the flywheel 54 projects into a tubular flange 56 integral with the end cap 41, there being an annular radial gap 58 between the cylindrical telescoped surfaces of the flywheel 54 and the flange 56. A second tubular flange 59, integral with the end cap 41 and having a smaller diameter than the flange 56, projects towards, but terminates short of, the outer radial face of the flywheel 54, the flange 59 being dimensioned to surround the outer peripheral face of the disk 49 and defining therebetween a second radial gap 60. Thus, the end cap 41 with its flanges 56, 59, flywheel 54, and disk 49 with its flanges or pole faces 51, 52 define a toroidal shaped flux circuit 61 including radial gaps 58 and 60, which gaps are sufficiently large in area to carry the flux required for producing the desired high density between the driving and driven radial faces of the flywheel 54 and the disk 49 and its ring of friction material 50. For creating the flux threading through the circuit 61, a multiple turn annular clutch coil 62 is secured to the end cap 41 between the flanges 56, 59 and within the circuit 61. As a consequence of this construction, when the coil 62 is energized, the flux threading axially through the opposed clutch faces draws the disk 49 into intimate clutched engagement with the driving flywheel 54.

The illustrative power transmitter also includes an electromagnetic friction brake, generally indicated at 64, having an internally splined disk 65 of magnetic material loosely mounted on the externally splined ring 44 outboard of the clutch disk 49 and adapted to be selectively drawn into intimate frictional braking engagement with a stationary plate 66 rigidly secured to the end cap 41. The brake disc 65 is formed in a manner similar to the clutch disk 49, here being provided with flanges 68, 69 defining radial pole faces flush with the outer face of a ring of friction material 70, the latter being confined in the annular channel defined by the flanges 68, 69. The disk 65 is dimensioned so as to define a radial gap 71 between its outer peripheral edge and the inner surface of the flange 59.

An annular multiple turn brake coil 72 is securely mounted within the end cap 41, the coil being disposed between the tubular flange 59 and a smaller tubular flange 74 integral with the end cap. As shown in FIG. 2, the coil 72 is disposed within a toroidal shaped flux circuit 75 defined by the end cap 41 with its flanges 59, 74, brake plate 66, and brake disk 65 with its flanges or pole faces 68, 69, the flux circuit 75 here including radial gap 71. Thus, when the brake coil is energized, the disk 65' is drawn into gripping engagement with the plate 66.

In accordance with one of the important aspects of the present invention, provision is made for automatically breaking the energizing circuit for the clutch coil 62 whenever the speed of the sewing machine 10 excceds a predetermined selectable value w, and for automatically reestablishing the clutch energizing circuit so as to reenergize the clutch coil 62 whenever the speed of the sewing machine drops below the particular speed w that has been selected. To accomplish this, the exemplary sewing machine 10 is provided with a speed controller or governor, generally indicated at 76 (FIGS. 1, 2 and 3), having a centrifugally operated "make and break" switch 78 (best illustrated in FIGS. 3 and 4) adapted to be selectively inserted into the clutch energizing circuit.

Figure 3:
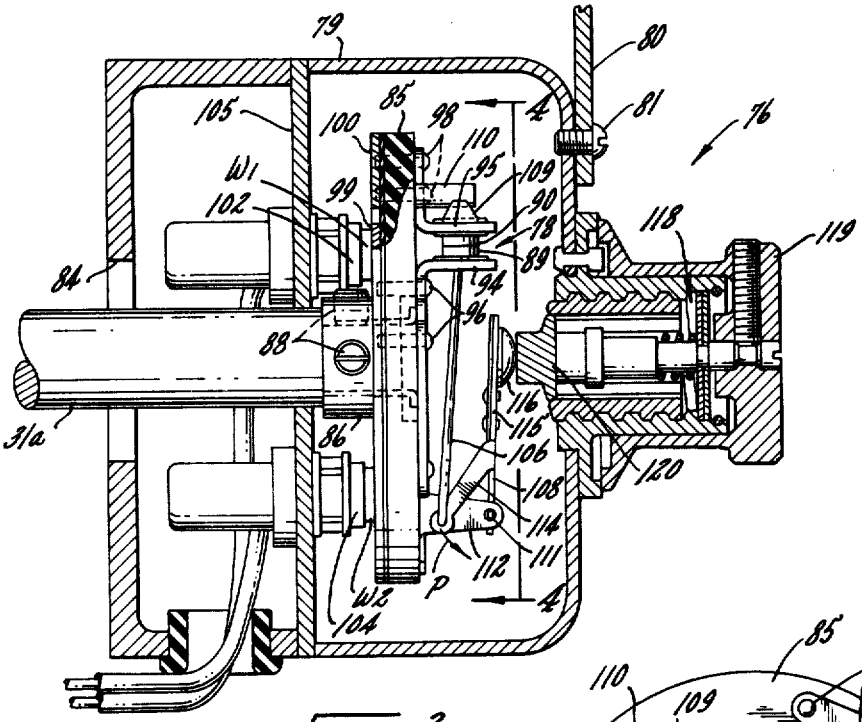
FIG. 3 is an enlarged vertical sectional view of an exemplary centrifugal type speed controller used in conjunction with the present invention.

Referring to FIGS. 2 and 3 conjointly, it will be noted that the illustrative speed controller 76 includes a housing 79 which is rigidly secured to a bracket 80 by any suitable fastening means such, for example, as a threaded fastener 81. While it will become apparent as the ensuing description proceeds that the speed controller 76 could be coupled to any driven system component such, for example, as the handwheel 34 or the shaft 19, it is here shown as coupled directly to the clutch output shaft 91 (FIG. 2). To this end, the bracket 80 is secured to the lower surface of the table 11 by means of a screw 82 or similar fastener, while the housing 79 is provided with an opening 84 into which projects an outboard shaft extension 31a integral with the clutch shaft 31. A disk 85 formed of any suitable nonconductive material and having an integral sleeve-like hub insert 86 is rigidly secured by means of set screws 88 or the like to the inwardly projecting end of the shaft extension 31a for simultaneous rotation with the shaft 31.

Figure 4:
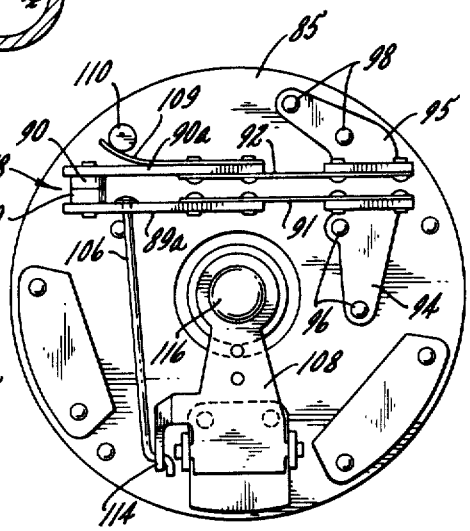
FIG. 4 is an end view taken substantially along the line 4—4 of FIG. 3.

In the exemplary speed controller 76, the centrifugally operated "make and break" switch 78 is mounted on one face of the disk 88 and comprises a pair of contacts 89, 90 which are normally engaged or closed when the rotational speed of the disk 88, and hence the speed of all the driven machine component, is equal to or less than the preselected operating speed w. As best shown in FIG. 4, the contacts 89, 90 are mounted on respective different ones of a pair of conductive contact arms 89a, 90a secured to conductive, leaf springs 91, 92. The latter are carried by brackets 94, 95 which are, in turn, respectively secured to the disk 85 by fasteners 96, 98. The arrangement is such that the fasteners 96, 98 pass completely through the disk 85 and are electrically connected with respective different ones of a pair of radially spaced, concentric, annular rings 99, 100 (FIG. 3) formed on the opposite face of the disk and positioned to be engaged with different ones of a pair of stationary wipers W–1, W–2. The wipers are here supported by holders 102, 104 mounted on a stationary housing plate 105.

In carrying out the invention, the innermost contact 89 is held in a fixed position by means of an adjusting link 106 having one end secured to the contact arm 89a and its opposite end secured to an adjusting lever 108 mounted on the face of the disk 85. Thus, the link 106 prevents movement of the contact 89 due to centrifugal forces during rotation of the disk 85. However, the outermost contact 90 is free to move outwardly—i.e., away from contact 89—to a limited extent whenever the speed of the disk 85 reach a value such that the centrifugal forces present are sufficient to overcome the biasing effect of spring arm 92 and a biasing spring 109, the latter having one end secured to the arm 90a and its opposite end abutting a stop lug 110 integral with the disk 85.

Figure 5:
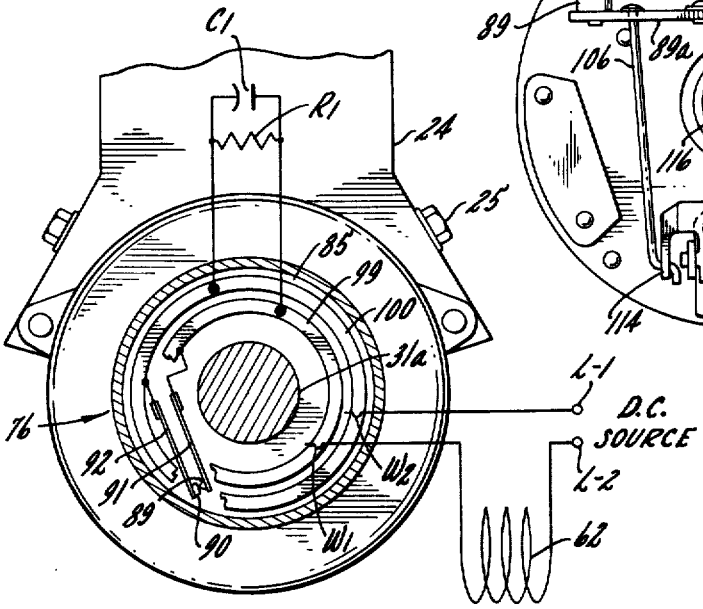
FIG. 5 is a schematic wiring diagram here utilized to simplify an understanding of the mode of operation of the exemplary centrifugal speed controller shown in FIGS. 3 and 4.

In order to facilitate an understanding of the operation of the exemplary speed controller 76, reference is here made to FIG. 5 wherein certain of the elements described above are depicted in schematic form. As here shown, it will be observed that the conductive ring 100 is coupled by means of the wiper W–2 directly to one terminal L–1 of a suitable D.C. source (not shown), while the ring 99 is electrically coupled through the wiper W–1 to the clutch coil 62 and thence to the other terminal L–2 of the D.C. source. As long as the speed of the disk 85 remains equal to or below a preselected speed w, the contacts 89, 90 remain closed and an energizing circuit for the clutch coil 62 is completed from the terminal L–1, through wiper W-2, ring 100 leaf spring 92 (including spring bracket 95 and fasteners 98—FIGS. 3 and 4), contacts 89, 90, spring 91 (including spring bracket 94 and fasteners 96—FIGS. 3 and 4), ring 99, wiper W–1, and coil 62, back to the terminal L–2. However, when the speed of the disk 85 exceeds the preselected speed w, the contacts 89, 90 open due to shifting of the contact 90 under the centrifugal forces present in the system, thus breaking the energizing circuit for the clutch coil 62 and permitting the disk 85 to slow down. As soon as the speed of the disk again drops below the preselected speed w, the contacts 89, 90 reclose and the coil 62 is again energized. Those skilled in the art will appreciate from the foregoing that the contacts 89 and 90 will rapidly and continuously "make and break" on a periodic basis so as to insure that the disk 85 (and hence all other driven system components) is driven at a substantially constant preselected speed w irrespective of variations in the driven load or fluctuations in line voltage.

In order to provide close, accurate, smooth control over the regulated operating speed permitted by the exemplary speed controller 76, a resistor R–1 may be connected across the contacts 89, 90 thus insuring that when the contacts are closed, a maximum voltage (here, line voltage) is applied to the clutch coil 62 and, when the contacts 89, 90 are open, a lesser voltage is applied across the clutch coil 62 because of the voltage drop across the series resistor R–1 which is introduced into the clutch energizing circuit. By proper selection of a resistor R–1 having suitable characteristics, it is, therefore, possible to insure that the sewing machine 10 will run smoothly at any particular speed for any given set of load conditions. A capacitor C–1 is preferably connected across the contacts 89, 90 for the purpose of absorbing the decay transient of the clutch coil 62 when the energizing circuit for the latter is interrupted.

In keeping with one of the important objectives of the invention, means are provided for permitting adjustment of the preselected operating speed w, so as to permit production operations under optimum speed conditions commensurate with the particular job being performed or, in a training operation, to permit adjustment of machine speed as the operator-trainee's proficiency increases. In the illustrative device, this is accomplished by varying the biasing effect of the springs 92, 109, for example, by shifting the contact 89 inwardly, thus varying the centrifugal force required to open the contacts. To this end, the adjusting lever 108 is pivoted at 111 to a bracket 112 integral with the disk 85, the lever being provided with a tang 114 to which is secured the adjusting link 106. The lever 108 further includes a radially extending arm 115 having an actuating button 116 formed on its inner end coaxial with the axis of rotation of the disk 85.

The arrangement is such that any suitable manually adjustable device (such, merely by way of example, as the threaded control knob and plunger assembly 118 shown in FIG. 3) can be utilized to convert rotary motion of a control knob 119 to linear axial motion of an actuating plunger 120, the latter being adapted to engage and shift the button 116 in an axial direction. Shifting of the button 116 inwardly (i.e., to the left as viewed in FIG. 3) serves to pivot the lever 108 in a counterclockwise direction about its pivot point 111, thus causing the junction point between the link 106 and the tang 114 to move in a clockwise direction (i.e., along the path described by arrow P in FIG. 3) and shifting the link 106 downwardly. As the link 106 moves, the contact arm 89a and contact 89 are shifted downwardly, or away from the stop lug 110, thus decreasing the biasing force created by springs 109 and 92 which tends to hold the contacts 89, 90 closed, and reducing the centrifugal forces required to open the contacts.

The overall operations of the exemplary power transmission system and electrical control circuits associated with the form of the invention shown in FIGS. 1–4 will here be described in detail in conjunction with the schematic wiring diagram shown by way of example in FIG. 7.

In order to prepare or condition the sewing machine 10 for an operating cycle, the operator first turns the ON-OFF switch 121 (FIGS. 1 and 7) to the "ON" state, thus coupling the terminals L–1, L–2 of a suitable A.C. source (not shown) directly to the motor 35 (FIGS. 2 and 7) and to the power supply for the brake coil 72 and the clutch control circuit 122. At this time, the foot treadle 124 associated with a "foot controller," generally indicated at 125 in FIGS. 1 and 7, is "heeled," thus closing the normally open contacts TS1 controlled by a treadle switch (not shown) disposed beneath the treadle 124 and completing an energizing circuit for the brake coil 72. The motor 35 is now running, the clutch coil 62 is deenergized, and the brake coil 72 is energized. The sewing machine 10 is now in readiness for an operating cycle.

In the exemplary circuit, the terminals L–1, L–2 of the A.C. source are coupled to the primary winding $w_1$ of a transformer E1 having a secondary winding $w_2$. As here shown, the secondary winding $w_2$ provides a source of voltage for the brake and clutch coils through a voltage doubler 126 including diodes D1, D2 and capacitors C2, C3. Referring to FIG. 7, it will be observed that the voltage source for the brake coil 72 is derived from the terminals t1, t2 of the voltage doubler 126. As a consequence of this construction, at the instant the brake is energized, a maximum voltage, for example, approximately 300 volts, is applied across the terminals of the brake coil 72 through the contacts TS1 and a capacitor C4. However, when the capacitor C4 charges, the energizing circuit for the coil 72 is completed through a current limiting resistor R2 which serves to drop the voltage supplied to the coil 72 to its standard rated capacity, for example, approximately 90 volts. In the energizing circuit for the clutch coil 62, on the other hand, the voltage is derived from the terminals t2, t3 of the voltage doubler 126—that is, across the terminals of only the capacitor C3 which acts as a filter to smooth the pulsating voltages applied to the coil. Thus, the clutch coil is energized at a considerably lower voltage level than the brake coil, a level which, for example, may be approximately 60 volts under high-speed operating conditions and a lesser voltage level at lower selected operating speeds.

Assuming that the operator desires to run the sewing machine 10 at a constant slow speed (as compared to its constant high speed when full line voltage across the terminals t2, t3 is continuously applied across the clutch coil 62), it is simply necessary that the treadle 124 associated with the operator actuated foot controller 125 be "toed" or depressed slightly. This serves to open the contacts TS1 in the brake energizing circuit, thus deenergizing the brake coil 72 and permitting transmission of power from the motor 35 to the clutch shaft 31. At the same time, slight "toeing" or depression of the treadle 124 serves to shift the speed selector wiper W-3 of the foot controller 125 into engagement with a slow speed terminal SS of the latter, thus coupling the terminal t3 of the voltage doubler 126 to the clutch coil 62 through the speed controller 76 and a variable resistor R3. This completes an energizing circuit for the clutch coil 62 through the speed controller 76 which functions in the manner described above to regulate the speed of the clutch shaft 31 and maintain the latter at a substantially constant speed w. Thus, when the contacts 89, 90 are closed (i.e., when the speed of the disk 85 is equal to or less than w), the full line voltage (less the voltage drop across variable resistor R3) derived from the terminals t2, t3 of the voltage doubler 126 is applied across the clutch coil. When the speed of the disk 85 exceeds w, the centrifugal forces developed will cause the contacts 89, 90 to open or "break," thus completing the energizing circuit for the clutch coil 62 through the current limiting resistor R1 and the variable resistor R3. The voltage drop across the former is sufficient to cause the sewing machine 10 to again drop to a speed at, or slightly below, w, whereupon the contacts 89, 90 reclose. Periodic opening and closing of the contacts 89, 90 will, in the foregoing manner, maintain the sewing machine speed substantially constant at the selected speed w. And, of course, this speed w may be readily adjusted within a relatively wide range by the simple expedient of turning the control knob 119 of the manually operable speed adjuster 118 (FIG. 3).

In keeping with the invention, provision is also made for insuring that the regulated speed w of the sewing machine 10 remains substantially constant irrespectvie of minor deviations in the position of the treadle 124 occasioned by inadvertent changes in the pressure exerted thereon by the operator's foot. To this end, the speed selector wiper W–3 and the slow speed terminal SS of the foot controller define a sector contact which will remain closed irrespective of minor changes in treadle position. While the illustrative sector contact is here shown as comprising a slow speed terminal SS having an arcuate configuration, those skilled in the art will appreciate that the foot controller 125 could take other forms and still fall within the scope of the invention. Merely by way of example, the speed selector wiper W–3 could have a cam surface formed thereon adapted to slidably engage a slow speed terminal SS defining a point contact. In either case, the wiper and slow speed terminal define a sector contact which permits of minor deviations in treadle position without disrupting operation of the speed controller 76.

While a sewing machine 10 embodying a speed controller 76 of the foregoing character will find particularly advantageous application in either training operations or in production operations wherein it is desirable to maintain the operating speed of the machine at a relatively slow constant speed level w, it is often desirable that the same machine be operated at a different and faster substantially constant speed $w_f$. To permit operation of the sewing machine at such a faster speed, the exemplary foot controller 125 includes a high-speed terminal HS which is coupled directly to the clutch coil 62 through the variable resistor R3. The arrangement is such that when the operator desires to run the sewing machine at a substantially constant, relatively high speed $w_f$, it is simply nceessary to "toe" or depress the foot treadle 124 fully, thus shifting the wiper W–3 into engagement with the high-speed terminal HS and effectively bypassing the slow-speed regulator or controller 76. In this mode of operation, the voltage applied across the clutch coil 62 will be the line voltage derived from the terminals t2, t3 of the voltage doubler 126 (less any voltage drop across variable resistor R3) and the machine 10 will, therefore, run at a high rate of speed $w_f$ which will remain substantially constant except for changes in line voltage and changes in loading conditions.

Upon completion of an operating cycle at either the low constant speed w or the high constant speed $w_f$, it is simply necessary to "heel" the treadle 124 in a conventional manner so as to effect stopping of the sewing machine. Thus when the treadle is "heeled," the wiper W–3 moves to a position spaced from both the high-speed terminal HS and the slow-speed terminal SS, thereby de-energizing the clutch coil 62 and breaking the drive connection between the motor shaft 36 and the clutch shaft 31. At the same time, "heeling" of the treadle 124 closes the contacts TS1 of the treadle switch, thus completing an energizing circuit for the brake coil.

In order to further enhance the versatility of sewing machines embodying the features of the present invention, provision may be made for permitting selective operation of the sewing machine 10 at either a substantially constant slow speed w, a substantially constant fast speed $w_f$, or at any desired speed infinitely variable between fixed upper and lower limits. To this end, there is illustrated in FIG. 8 a slightly modified sewing machine power transmission system also embodying the features of the present invention. In view of the similarities in the two illustrative systems, like parts in both systems will be designated by identical reference numerals, and those parts not common to the two systems will be designated by different reference numerals.

It will be observed upon comparison of the illustrative circuits shown in FIGS. 7 and 8, that provision is made in both systems for permitting selective operation of the sewing machine at either a substantially constant slow speed w (i.e., when the wiper W–3 is engaged with the terminal SS) or at a substantially constant high speed $w_f$ (i.e., when the wiper W–3 is engaged with the terminal HS). However, in the exemplary system shown in FIG. 8, a modified type of foot controller 125' is provided which incorporates not only a slow-speed terminal SS and a high-speed terminal HS, but, in addition, includes an operator controlled rheostat 128 which permits of operation at a selectable variable speed $w_v$ determined by the position of the wiper W–3 which here constitutes the wiper of the rheostat 128. In this instance slight "toeing" or depression of the treadle 124 completes a slow speed energizing circuit for the clutch coil 62 through the speed controller 76 by virtue of closure of the sector contact W–3, SS. If high speed operation is desired, the treadle 124 is fully "toed" so as to shift the wiper W–3 to the high speed terminal HS.

However, where the particular job being performed by the operator requires operation at numerous different speeds, the treadle 124 is "toed" sufficiently to shift the wiper W–3 past the terminal SS and into engagement with the resistor R4 which forms part of the rheostat 128. In this condition, variations in the position of the treadle 124 under control of the operator's foot will effectively vary the total resistance in the energizing circuit for the clutch coil 62, thus permitting energization of the latter at a selectable one of an infinitely variable number of different voltage levels and causing operation of the sewing machine 10 at a speed $w_v$ dependent upon the extent of the magnetic coupling between the driving and driven clutch elements 54, 49 (i.e., as the treadle 124 is progressively "toed" through greater angular increments, the resistance in the clutch energizing circuit is progressively decreased, thereby progressively increasing the energizing voltage for the coil 62 and thus the magnetic coupling between the clutch elements 49, 54).

Turning next to FIGS. 6 and 9, there is shown a slightly modified power transmission system similar to the system shown in FIGS. 1–5 and 7, but which here permits of selective machine operation at any one of n different constant speeds (n here being equal to four different speeds). Again, because of the similarities in the two systems, like parts in both systems will be designated by similar reference numerals and those parts not common to the two systems will be designated by different reference numerals.

As best shown in FIG. 6, three substantially identical speed controllers 76, 76' and 76'' respectively having hub inserts 86, 86' and 86'' are rigidly secured by means of fasteners 88 in axially spaced relation upon a hollow tubular shaft 129 integral with the clutch shaft extension 31a. The specific structural details of each of the three spaced controllers 76, 76' and 76'' are identical to that previously described in connection with FIGS. 3 and 4 and, therefore, will not be further detailed here. It should suffice to point out that the three sets of "make and break" contacts 89–90, 89'–90' and 89''–90'' are here set to "break" due to centrifugal forces at three different constant slow speed settings w, w' and w'', and this can be achieved either by selective and independent manual adjustment of the adjusting levers 106, 106' and 106'' or, alternatively, by varying the design characteristics of the springs, contacts and contact arms of the different controllers 76, 76', 76''.

To permit independent manual adjustment of the speed settings for the three controllers 76, 76' and 76'', each is provided with an actuating button (buttons 116a, 116' and 116'' respectively) similar to the button 116 shown in FIG. 3, the buttons being coaxially spaced with buttons 116', 116'' disposed within sleeve 129. To permit axial shifting of the buttons 116' and 116'', the latter are mounted on the innermost ends of arms 115', 115'' respectively associated with adjusting levers 108', 108''—the arms 115', 115'' respectively passing through elongate slots 130, 131 formed in the tubular shaft 129. In this instance, the button 116a is annular in configuration and is shifted axially by means of any suitable type of axially shiftable tubular plunger 120a. In like manner, the button 116' is also annular and is shifted axially by means of an independently adjustable tubular actuating plunger 120' which passes through the plunger 120a and button 116a with freedom for sliding movement relative thereto. The button 116'' is adjusted axially by means of a separate actuating plunger 120'' passing through the plungers 120a, 120' and the buttons 116a, 116' with freedom for sliding movement relative thereto. The particular means employed for shifting the plungers 120a, 120' and 120'' axially is not critical to the present invention and may be similar to the adjusting assembly 118 shown in FIG. 3 or, alternatively, may take any other form well known to those skilled in the art.

The foregoing arrangement is such that the three speed controllers 76, 76' and 76'' serve to maintain the operating speed of the sewing machine 10 at a selectable one of three different constant speed settings w, w', or w'' dependent upon which of the three controllers is selected, and each speed setting is independently adjustable. Of course, those skilled in the art will appreciate that the speed controllers 76, 76' and 76'' could be disposed in other than coaxial relation. Moreover, there could be more or fewer than the illustrative three speed controllers dependent upon the particular requirements of the user.

Turning next to FIG. 9, it will be observed that the three speed controllers 76, 76' and 76'' shown in FIG. 6 are here electrically connected to respective different ones of three slow speed terminals SS, SS' and SS'' disposed within a modified foot controller 125'' similar to the controller 125 shown in FIGS. 1 and 7. In this instance, the speed controllers 76, 76' and 76'' may be selectively inserted into the energizing circuit for the clutch coil 62 one at a time by the simple expedient of "toeing" the treadle 124 a sufficient amount to close a selectable one of the three sets of sector contacts W–3, SS; W–3, SS'; or W–3, SS''. Alternatively, all three of the speed controllers may be bypassed by "toeing" the treadle 124 so as to shift the wiper W–3 to a position engaging the high speed terminal HS in the foot controller 125.

It will be appreciated from the foregoing that a power transmission system embodying the features of the present invention will be characterized by its simplicity, effectiveness, and reliability in operation. The provision of n centrifugal speed controllers (where n can be equal to "1," or any desired multiple thereof) of the type which permit accurate control of the energizing voltages applied to the clutch coil in a sewing machine electromagnetic clutch, insures that the sewing machine can be operated at a selectable one of n+1 different speeds, all of which are maintained relatively constant with a high degree of accuracy, and wherein the n relatively slow speeds are maintained substantially constant irrespective of variations in load and line voltage. At the same time, the requirement for heavy, bulky, and expensive auxiliary drive motors and auxiliary power take-offs which require speed reducing gear trains, together with their lubrication and other inherent servicing problems attendant such devices, is eliminated, thereby providing a quiet, compact, lightweight, sewing machine power transmission which is relatively inexpensive and maintenance free.

I claim as my invention:

1. In combination with a sewing machine of the type having a reciprocable needle operatively connected to and driven by a clutch shaft, a power transmission system for driving said machine at a predetermined speed and comprising a power source including a drive shaft, a drive element secured to said drive shaft, a driven element secured to said clutch shaft, and electromagnetic means including a coil for establishing a flux circuit threading through said drive and driven elements whereby a driving connection is established between said elements when said coil is energized so as to transmit power from said power source to said needle, a voltage source for energizing said coil, and means coupling said coil to said voltage source, said coupling means including a speed responsive centrifugally actuated switch including a speed responsive centrifugally actuated switch device for reducing the voltage supplied to said coil whenever the speed of said machine exceeds said predetermined speed and for increasing the voltage supplied to said coil when the speed of said machine drops to said predetermined speed whereby said machine is driven at said predetermined speed.

2. In combination with a sewing machine of the type having a reciprocable needle operatively connected to and driven by a clutch shaft, a power transmission system for driving said machine at a predetermined speed and comprising a power source including a drive shaft, a drive element secured to said drive shaft, a driven element secured to said clutch shaft, and electromagnetic means including a coil for establishing a flux circuit threading through said drive and driven elements whereby a driving connection is established between said elements when said coil is energized so as to transmit power from said power source to said needle, a voltage source for energizing said coil, and a speed controller coupled to and driven by said clutch shaft, said controller including first and second contacts connected to respective different ones of said coil and said voltage source, means biasing one of said contacts into engagement with the other of said contacts so that said contacts are closed when the clutch shaft is driven at speeds less than said predetermined speed to complete an energizing circuit for said coil and so that when the speed of the clutch shaft exceeds said predetermined speed the centrifugal forces developed overcome said biasing means whereupon said one contact moves away from the other of said contacts to interrupt the energizing circuit for said coil.

3. In combination with a sewing machine of the type having a reciprocable needle operatively connected to and driven by a clutch shaft, a power transmission system for driving said machine at a predetermined speed and comprising a power source including a drive shaft, a drive element secured to said drive shaft, a driven element secured to said clutch shaft, and electromagnetic means including a coil for establishing a fluix circuit threading through said drive and driven elements whereby a driving connection is established between said elements when said coil is energized so as to transmit power from said power source to said needle, a voltage source for energizing said coil, a centrifugally operated make and break switch coupled to and driven by said clutch shaft, said switch having terminals connected to respective ones of said voltage source and said coil for completing an energizing circuit for the latter when said switch is closed, and means for urging said switch to its closed state at all speeds less than said predetermined speed, said last named means being insufficient to overcome the centrifugal force developed at speeds in excess of said predetermined speed whereupon said switch is centrifugally shifted to its open state to interrupt the energizing circuit for said coil.

4. In combination with a sewing machine of the type having a reciprocable needle operatively connected to and driven by a clutch shaft, a power transmission system for driving said machine at a selectable and variable predetermined speed and comprising a power source including a drive shaft, a drive element secured to said drive shaft, a driven element secured to said clutch shaft, and electromagnetic means including a coil for establishing a flux circuit threading through said drive and driven elements whereby a driving connection is established between said elements when said coil is energized so as to transmit power from said power source to said needle, a voltage source for energizing said coil, a centrifugally operated make and break switch coupled to and driven by said clutch shaft, said switch having terminals connected to respective ones of said voltage source and said coil for completing an energizing circuit for the latter when said switch is closed, biasing means for urging said switch to its closed state at all speeds less than said predetermined speed, said last named means being insufficient to overcome the centrifugal force developed at speeds in excess of said predetermined speed whereupon said switch is centrifugally shifted to its open state to interrupt the energizing circuit for said coil, and means for selectively varying the predetermined speed at which said switch opens, said last named means including means for varying the biasing effect of said biasing means so as to vary the centrifugal force required to shift said switch to its open state.

5. In combination with a sewing machine of the type having a reciprocable needle operatively connected to and driven by a clutch shaft, a power transmission system for driving said machine at a predetermined speed and comprising a power source including a drive shaft, a drive element secured to said drive shaft, a driven element secured to said clutch shaft, and electromagnetic means including a coil for establishing a flux circuit threading through said drive and driven elements whereby a driving connection is established between said elements when said coil is energized so as to transmit power from said power source to said needle, a voltage source for energizing said coil, a centrifugally operated make and break switch coupled to and driven by said clutch shaft, said switch having terminals connected to respective ones of said voltage source and said coil for completing an energizing circuit for the latter when said switch is closed, means for urging said switch to its closed state at all speeds less than said predetermined speed, said last named means being insufficient to overcome the centrifugal force developed at speeds in excess of said predetermined speed whereupon said switch is centrifugally shifted to its open state to interrupt the energizing circuit for said coil, and means coupling said voltage source to said coil for supplying a reduced voltage to the latter when said switch is open.

6. In combination with a sewing machine of the type having a reciprocable needle operatively connected to and driven by a clutch shaft, a power transmission system for driving said machine at a substantially constant predetermined speed and comprising a power source including a drive shaft, a drive element secured to said drive shaft, a driven element secured to said clutch shaft, said drive and driven elements being supported to move together and form a friction drive connection therebetween, and electromagnetic means including a coil for establishing a flux circuit threading through said drive and driven elements to move the same together whereby a driving connection is established between said elements when said coil is energized so as to transmit power from said power source to said needle, a voltage source for energizing said coil, first and second energizing circuit connecting said coil and said voltage source for respectively energizing said coil at first and second voltage levels sufficient to drive said clutch shaft at first and second speeds above and below said predetermined speed, and means for alternately energizing said coil through said first and second circuits on a rapid periodic basis as the speed of said clutch shaft falls below or rises above said predetermined speed so that said machine is driven at said substantially constant predetermined speed between said first and second speeds.

7. In combination with a sewing machine of the type having a reciprocable needle operatively connected to and driven by a clutch shaft, a power transmission system for driving said machine at a selectable one of n constant speeds comprising, a power source including a drive shaft, a drive element secured to said drive shaft, a driven element secured to said clutch shaft, said drive and driven elements being supported to move together and form a friction drive connection therebetween, electromagnetic means including a coil for establishing a flux circuit threading through said drive and driven elements to move the same together whereby a driving connection is established between said elements when said coil is energized, a voltage source for energizing said coil, n speed responsive devices respectively corresponding to said n constant speeds for selectively coupling said voltage source to said coil to energize the latter, each of said n speed responsive devices being normally disconnected from one of said coil and said voltage source, selector means for coupling said voltage source to said clutch coil through a selected one of said n speed responsive devices, said selected device adapted to reduce the voltage supplied to said coil from said voltage source whenever the speed of said machine exceeds the one of said n constant speeds corresponding to the selected one of said n devices and to increase the voltage supplied to said coil when the speed of said machine drops to said one of said n constant speeds whereby said machine is driven at said selected one of said n constant speeds.

8. In combination with a sewing machine of the type having a reciprocable needle operatively connected to and driven by a clutch shaft, a power transmission system for driving said machine at a selectable one of an infintely variable speed and n constant speeds comprising, a power source including a drive shaft, a drive element secured to said drive shaft, a driven element secured to said clutch shaft, said drive and driven elements being supported to be moved together to form a friction drive connection therebetween, electromagnetic means including a coil for establishing a flux circuit threading through said drive and driven elements to move the same together whereby a driving connection is established between said elements when said coil is energized, a voltage source for energizing said coil, n speed responsive devices respectively corresponding to said n constant speeds for selectively coupling said voltage source to said coil to energize the latter, selectively operable means coupling said voltage source to said coil for energizing the latter at a selectable and infinitely variable level, each of said n speed responsive devices and said selectively operable means being normally disconnected from one of said coil and said voltage source, selector means for coupling said voltage source to said clutch coil through a selected one of said n speed responsive devices and said selectively operable means, said devices each adapted upon selection to reduce the voltage supplied to said coil from said voltage source whenever the speed of said machine exceeds the one of said n constant speeds corresponding to the selected one of said n devices and to increase the voltage supplied to said coil when the speed of said machine drops to said one of said n constant speeds whereby said machine driven at said selected one of said n constant speeds, and said selectively operable means being effective upon activation by said selector means to provide a selectable and infinitely variable voltages to said coil for energizing the latter at a selectable level determined by the position of said selector means.

9. In combination with a sewing machine of the type having a reciprocable needle operatively connected to and driven by a clutch shaft, a power transmission system for driving said machine at a selectable one of at least three different substantially constant speeds comprising, a power source including a drive shaft, a drive element secured to said drive shaft, a driven element secured to said clutch shaft, said drive and driven elements being supported to move together to form a friction drive connection therebetween, electromagnetic means including a coil for establishing a flux circuit threading through said drive and driven elements to move the same together whereby a driving connection is established between said elements when said coil is energized, a voltage source for energizing said coil, at least two speed responsive devices respectively corresponding to at least two of said constant speeds for selectively coupling said voltage source to said coil to energize the latter, means defining a high speed circuit for selectively coupling said voltage source to said coil to energize the latter, each of said speed responsive devices and said high speed circuit being normally disconnected from one of said coil and said voltage source operator controlled selector means for coupling said voltage source to said clutch coil through a selected one of said speed responsive devices and said high speed circuit, said devices each adapted upon selection by said selector means to reduce the voltage supplied to said coil from said voltage source whenever the speed of said machine exceeds the one of said constant speeds corresponding to the selected one of said devices and to increase the voltage supplied to said coil when the speed of said machine drops to said one of said constant speeds whereby said machine is driven at said selected one of said constant speeds, and said high speed circuit being adapted upon selection by said selector means to supply a maximum voltage to said coil whereby said machine is driven at the highest of said substantially constant speeds.

10. In combination with a sewing machine of the type having a reciprocable needle operatively connection to and driven by a clutch shaft, a power transmission system for driving said machine at a selectable one of a first predetermined substantially constant speed w and a second speed comprising, a power source including a drive shaft, a drive element secured to said drive shaft, a driven element secured to said clutch shaft, said drive and driven elements being supported to move together to form a friction drive connection therebetween, electromagnetic means including a coil for establishing a flux circuit threading through said drive and driven elements to move the same together whereby a driving connection is established between said elements when said coil is energized, a voltage source for energizing said coil, first and second coupling means normally disconnected from one of said voltage source and said coil for selectively coupling said voltage source to said coil to energize the latter, and selector means for coupling said voltage source to said coil through a selectable one of said first and second coupling means, said first coupling means including a speed responsive device for reducing the voltage supplied to said coil by said voltage source whenever the speed of said machine exceeds w and for increasing the voltage supplied to said coil when the speed of said machine drops to said constant speed w whereby said machine is driven at said first predetermined substantially constant speed w upon selection of said first coupling means and at said second speed upon selection of said second coupling means.

11. The combination set forth in claim 10 further characterized in that said second coupling means includes a high speed terminal coupled directly to one of said voltage source and said coil so that upon operation of said selector means to effect selection of said second coupling means said voltage source is directly coupled to said coil to effect maximum energization thereof and said machine is driven at a maximum, substantially constant speed.

12. The combination set forth in claim 10 further characterized in that said selector means is operator controlled, and said second coupling means defines with said selector means a rheostat connection so that upon operation of said selector means to effect selection of said second coupling means said machine is driven at a selectable and infinitely variable speed in accordance with the selected condition of said rheostat connection.

13. The combination set forth in claim 10 further characterized in that said second coupling means includes a speed responsive device for reducing the voltage supplied to said coil by said voltage source whenever the speed of said machine exceeds said second speed and for increasing the voltage supplied to said coil when the speed of said machine drops to said second speed so that upon selection of said second coupling means by operation of said selector means said machine is driven at a substantially constant rate of speed corresponding to said second speed.

14. In combination with a sewing machine of the type having a reciprocable needle operatively connected to and driven by a clutch shaft, a power transmission system for driving said machine at a selectable one of a first predetermined substantially constant speed w and a second speed comprising, a power source including a drive shaft, a drive element secured to said drive shaft, a driven element secured to said clutch shaft, said drive and driven elements being supported to move together to form a friction drive connection therebetween, electromagnetic means including a coil for establishing a flux circuit threading through said drive and driven elements to move the same together with a force proportional to the energization of said coil whereby a driving connection is established between said elements when said coil is energized, a voltage source for energizing said coil, first and second coupling means normally disconnected from one of said voltage source and said coil for selectively coupling said voltage source to said coil to energize the latter, and operator controlled selector means for coupling said voltage source to said coil through a selectable one of said first and second coupling means, said operator controlled selector means defining at least one sector contact so that minor deviations in the position of said selector means are ineffective to interrupt the voltage supplied to said coil by said source, said first coupling means including a speed responsive device for reducing the voltage supplied to said coil by said voltage source whenever the speed of said machine exceeds w and for increasing the voltage supplied to said coil when the speed of said machine drops to said constant speed w whereby said machine is driven at said first predetermined substantially constant speed w upon selection of said first coupling means and at said second speed upon selection of said second coupling means.

*15. Speed control apparatus for controlling the operating speed of a work utility which it is desired to drive at any of a plurality of selectable different speeds from a constant speed primary drive source, comprising in combination,*

*a power transmission having a rotary input drive shaft connectable to a constant speed drive source, a rotary output drive shaft connectable to the work utility to drive the latter, and an electrically actuatable clutch effective when actuated for coupling the rotary output drive-shaft to the rotary input drive-shaft, said speed control apparatus comprising in combination,*

*speed selection electric switch means for selecting any one of a plurality of different speeds at which it is desired to operate a work utility, and speed sensing electric switch means connected in electric circuit with the electrically actuatable clutch and a source of electric power, said speed sensing switch means being operatively coupled to the power transmission rotary output drive shaft for simultaneous rotation therewith and responsive to departure of the output drive shaft rotational speed from the selected desired speed to alter the electric circuit conditions to thereby actuate said clutch means whenever the output drive shaft rotational speed drops below said desired speed and to deactuate the clutch means whenever the output drive shaft rotational speed rises above the selected desired speed.*

*16. The speed control apparatus as set forth in claim 15 wherein said speed selection switch means further includes means for locking out of said electric circuit said speed sensing switch means and simultaneously continuously actuating the clutch independently of said speed sensing switch means.*

*17. The apparatus as set forth in claim 15 wherein the power transmission further includes output drive shaft selectively actuatable brake means, and wherein said speed control appaartus further includes selectively operable means coupled to the actuatable brake means effective when operated to actuate the brake means and quickly brake to a stop the power transmission output drive shaft.*

*18. Speed control apparatus for controlling the operating speed of a work utility which it is desired to drive at any of a plurality of selectable different speeds from a constant speed primary drive source, comprising in combination,*

*a power transmission having a rotary input drive shaft connectable to a constant speed drive source, a rotary output drive shaft connectable to the work utility to drive the latter, and an electrically actuatable clutch effective when actuated for coupling the rotary output drive-shaft to the rotary input drive-shaft, said speed control apparatus comprising in combination,*

*(a) a speed control governor including a rotor and a stator, said rotor being mechanically couplable to the transmission output drive shaft for simultaneous rotation therewith and including*

*(1) speed responsive electric switch means having openable and closable contacts mounted laterally of the rotor rotational axis and so oriented with respect thereto that changes in the centrifugal force exerted on said contacts developed by changes in rotor rotation rate cause the state of said switch contacts to change between closed state and open state,*

*(2) adjustable means engaged with said electric switch means effective to set the rotor rotation rate at which said switch means contacts change state, and*

*(3) a plurality of separate electrically conductive rings each of which is electrically connected to a different one of said switch contacts and concentric with the axis of rotor rotation,*

*said stator being mechanically fixedly positioned adjacent to said rotor and carrying individual electrical contacts each of which is electrically engaged with a different one of said rotor conductive rings,*

*(b) speed selection electric switch means connected in electric circuit through said stator contacts with said rotor carried speed responsive switch means and connectable with the electrically actuatable clutch and a source of electric power effective to selectably render said speed responsive switch means operative and inoperative for controlling the actuation of the electrically actuatable clutch,*

*said speed responsive switch means when operative being effective to alter the electric circuit conditions to actuate the clutch whenever the output drive shaft rotational speed drops below said selected speed and being effective to deactuate the clutch whenever the output drive shaft rotational speed rises above the selected speed.*

*19. The apparatus as set forth in claim 18 wherein said rotor carried speed responsive electric switch means includes at least two independent switches and wherein said adjustable means engaged therewith includes means for independently setting the rotor rotation rates at which the contacts of each rotor switch change state.*

*20. The apparatus a sset forth in claim 18 wherein said speed selection switch means renders the clutch continuously actuated whenever said speed responsive switch*

*means is rendered inoperative by said speed selection switch means.*

*21. The apparatus as set forth in claim 18 wherein the power transmission also includes output drive shaft selectively actuatable brake means, and wherein said apparatus further includes selectively operable control means coupled to the actuatable brake means effective when operated to actuate the brake to quickly brake to a stop the output drive shaft.*

*22. The apparatus as set forth in claim 18 wherein the power transmission also includes an output drive shaft selectively electrically actuatable brake, and wherein said apparatus further includes selectively operable control means in electric circuit with the electrically actuatable brake and clutch effective when operated to actuate the brake and deactuate the clutch to quickly brake to a stop said output drive shaft.*

References Cited

The following references, cited by the Examiner, are of record in the patented file of this patent or the original patent.

UNITED STATES PATENTS

| | | | |
|---|---|---|---|
| 1,994,626 | 3/1935 | Townsend | 318—325 |
| 2,246,803 | 6/1941 | Lee | 318—325 |
| 2,281,711 | 5/1942 | Peck et al. | 318—325 |
| 2,337,066 | 12/1943 | Schmitt et al. | 112—220 |
| 2,420,346 | 5/1947 | Anderson | 318—325 X |
| 2,920,221 | 1/1960 | Schwab | 112—219 |
| 2,214,901 | 9/1940 | Griffin | 192—103 X |
| 2,595,190 | 4/1952 | Edwards | 192—18.2 |
| 2,846,540 | 8/1958 | Neal | 200—80 |
| 2,528,316 | 10/1950 | Mayo | 192—104 X |
| 3,229,796 | 1/1966 | Worst | 192—104 |

BENJAMIN W. WYCHE III, Primary Examiner

U.S. Cl. X.R.

192—18, 104; 310—95